(12) United States Patent
Jeung et al.

(10) Patent No.: US 12,131,727 B2
(45) Date of Patent: Oct. 29, 2024

(54) FORCE GENERATING DEVICE

(71) Applicants: HYUNDAI MOTOR COMPANY, Seoul (KR); KIA CORPORATION, Seoul (KR)

(72) Inventors: Min Woong Jeung, Seoul (KR); Suk Hyung Jang, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 363 days.

(21) Appl. No.: 17/333,941

(22) Filed: May 28, 2021

(65) Prior Publication Data
US 2022/0165246 A1    May 26, 2022

(30) Foreign Application Priority Data

Nov. 20, 2020 (KR) .................. 10-2020-0156980

(51) Int. Cl.
| | | |
|---|---|---|
| *G10K 11/35* | (2006.01) | |
| *B06B 3/00* | (2006.01) | |
| *B06B 3/04* | (2006.01) | |
| *G10K 15/00* | (2006.01) | |

(52) U.S. Cl.
CPC ............. *G10K 11/352* (2013.01); *B06B 3/00* (2013.01); *G10K 15/00* (2013.01); *B06B 3/04* (2013.01)

(58) Field of Classification Search
CPC ........ G10K 11/352; G10K 15/00; B06B 3/00; B06B 3/04
USPC ........................................ 73/570.5
See application file for complete search history.

(56) References Cited

U.S. PATENT DOCUMENTS

| | | | | |
|---|---|---|---|---|
| 4,218,921 A | * | 8/1980 | Oran ..................... | F16C 32/00 310/90.5 |
| 4,284,403 A | * | 8/1981 | Rey ........................ | G10K 11/20 73/570.5 |
| 4,393,706 A | * | 7/1983 | Barmatz .................. | B01J 19/10 73/570.5 |

(Continued)

FOREIGN PATENT DOCUMENTS

| | | | | |
|---|---|---|---|---|
| CN | 105216999 A | * | 1/2016 | |
| CN | 106641057 A | * | 5/2017 | ............. B25J 17/02 |

(Continued)

OTHER PUBLICATIONS

Tang et al., An efficient semi-analytical procedure to calculate acoustic radiation force and torque for axisymmetric irregular bodies, Journal of Sound and Vibration, May 7, 2022, 19 pages (Year: 2022).*

(Continued)

*Primary Examiner* — Clayton E. LaBalle
*Assistant Examiner* — Kevin C Butler
(74) *Attorney, Agent, or Firm* — Lempia Summerfield Katz LLC

(57) ABSTRACT

A force generating device includes: a support unit; a link unit rotatably coupled to one side of the support unit; a transfer unit that is coupled to the link unit and transfers wave energy to the outside; and a drive unit that operates the link unit. In particular, the transfer unit is moved on an imaginary sphere by a motion of the link unit, and the transfer unit transfers the wave energy to a center of the imaginary sphere.

14 Claims, 6 Drawing Sheets

(56) References Cited

U.S. PATENT DOCUMENTS

| | | | | |
|---|---|---|---|---|
| 4,402,221 | A | * | 9/1983 | Lee ................... G10K 15/00 181/0.5 |
| 4,573,356 | A | * | 3/1986 | Barmatz ............. G10K 15/00 73/570.5 |
| 4,736,815 | A | * | 4/1988 | Barmatz ............. G10K 15/00 73/570.5 |
| 4,773,266 | A | * | 9/1988 | Barmatz ............. G10K 15/00 181/0.5 |
| 4,777,823 | A | * | 10/1988 | Barmatz ............. G10K 15/00 181/0.5 |
| 4,841,495 | A | * | 6/1989 | Danley ............... G10K 11/025 73/570.5 |
| 5,096,017 | A | * | 3/1992 | Rey .................... B01J 19/10 34/664 |
| 5,257,676 | A | * | 11/1993 | Merkley ............. G10K 15/00 367/191 |
| 5,500,493 | A | * | 3/1996 | Guigne ............... F16C 32/00 367/191 |
| 5,592,441 | A | * | 1/1997 | Kuhn .................. G10K 11/008 367/153 |
| 7,336,242 | B2 | * | 2/2008 | Phelan ................ H01Q 3/02 343/882 |
| 8,263,005 | B2 | * | 9/2012 | Laugharn, Jr. ...... B01L 3/50273 366/127 |
| 9,239,650 | B2 | * | 1/2016 | Lee .................... G06F 3/0425 |
| 10,281,567 | B2 | * | 5/2019 | Carter ................ G01S 7/52004 |
| 10,535,332 | B2 | * | 1/2020 | Maxwell ............. G10K 11/30 |
| 11,530,682 | B2 | * | 12/2022 | Rodrigues .......... F03D 3/0427 |
| 11,580,945 | B2 | * | 2/2023 | Maxwell ............. A61B 17/2255 |
| 2015/0084929 | A1 | * | 3/2015 | Lee .................... G06F 3/0425 345/175 |
| 2016/0124080 | A1 | * | 5/2016 | Carter ................ G01S 15/876 367/95 |
| 2017/0171536 | A1 | * | 6/2017 | Teller ................. H04N 13/393 |
| 2020/0384656 | A1 | * | 12/2020 | Noh ................... B25J 17/00 |
| 2022/0165246 | A1 | * | 5/2022 | Jeung ................. G10K 15/00 |

FOREIGN PATENT DOCUMENTS

| | | | | |
|---|---|---|---|---|
| CN | 106937227 | A | * | 7/2017 | ........... H04R 17/02 |
| CN | 107336245 | A | * | 11/2017 | |
| CN | 208612964 | U | * | 3/2019 | ........... B06B 1/0688 |
| CN | 109921681 | A | * | 6/2019 | |
| CN | 209189183 | U | * | 8/2019 | |
| CN | 110420825 | A | * | 11/2019 | |
| CN | 110420826 | A | * | 11/2019 | |
| CN | 110871159 | | * | 3/2020 | ............ B06B 3/04 |
| CN | 102360057 | B1 | * | 2/2022 | ........ A61B 17/22004 |
| CN | 102502607 | B1 | * | 2/2023 | ............ H01R 12/88 |
| DE | 102021003070 | A1 | * | 5/2022 | ........... G10K 11/352 |
| EP | 2662658 | A2 | * | 11/2013 | ............ B63B 1/36 |
| GB | 2513884 | A | * | 11/2014 | ............ G01S 15/36 |
| JP | 2017204690 | A | * | 11/2017 | |
| JP | 6960584 | B2 | * | 11/2021 | |
| JP | 7225829 | B2 | * | 2/2023 | |
| KR | 101550601 | B1 | * | 9/2013 | ........... G06F 3/0425 |
| KR | 20180039974 | A | * | 4/2018 | ............ B25J 9/126 |
| KR | 10-2162329 | B1 | | 10/2020 | |
| WO | WO-2005053863 | A1 | * | 6/2005 | ........... B06N 1/0633 |
| WO | WO-2016036551 | | * | 8/2015 | ............ B06B 3/04 |
| WO | WO-2017105676 | A1 | * | 6/2017 | ........... H04N 13/393 |
| WO | WO-2019207143 | A1 | * | 10/2019 | ............ B06B 1/02 |

OTHER PUBLICATIONS

Sergio Jiménez-Gambín et al, Generating Bessel beams with broad depth-of-field by using phase-only acoustic holograms, Scientific Reports (https://www.nature.com/scientificreports), 2019, 13 pages (Year: 2019).*

David Hoelzle, Masters Thesis: Adaptive, Wave Guiding Acoustic Arrays using Circularly Symmetric Reconfigurable Structures, Ohio State University, 2020, 72 pages (Year: 2020).*

Zou et al., Acoustic Wave Guiding by Reconfigurable Tessellated Arrays, American Physical Society, 2018, 26 pages (Year: 2018).*

Aguzzi et al., Octet lattice-based plate for elastic wave control, Scientific Reports (https://www.nature.com/scientificreports), 2022, 14 pages (Year: 2022).*

Babaee et al, Reconfigurable origami-inspired acoustic waveguides, Science Advances, Nov. 23, 2016, 8 pages (Year: 2016).*

Danielle T. Lynd, Chengzhe Zou, Joseph Crump, et al., Directive and focused acoustic wave radiation by tessellated transducers with folded curvatures, Acoustical Society of America, 2018, 12 pages (Year: 2018).*

Zhou et al., Generation of acoustic vortex beams with designed Fermat's spiral diffraction grating, Acoustic Society of America, Dec. 2019, 4237-4243 pg(s) (Year: 2019).*

Ozcelik et al, Acoustic tweezers for the life sciences, Nature Methods vol. 15, Dec. 2018, 1021-1028 (Year: 2018).*

Zhao et al., Partially activated reconfigurable arrays to guide acoustic waves, Journal of Intelligent Material Systems and Structures, 2021, vol. 32(2) 2529-2540 (Year: 2021).*

Fan et al, Reconfigurable curved metasurface for acoustic cloaking and illusion, Hal Open Science, Dec. 7, 2020, 32 pages (Year: 2020).*

Srinivas et al., Acoustic wave focusing by doubly curved origami-inspired arrays, Journal of Intelligent Material Systems and Structure, 2020, vol. 31(8), 1041-1052 (Year: 2020).*

* cited by examiner

FORCE GENERATING DEVICE

CROSS-REFERENCE TO RELATED APPLICATION

This application claims priority to and the benefit of Korean Patent Application No. 10-2020-0156980, filed on Nov. 20, 2020, the entire contents of which are incorporated herein by reference.

FIELD

The present disclosure relates to a force generating device, and more particularly, to a force generating device including an ultrasonic wave generating unit.

BACKGROUND

The statements in this section merely provide background information related to the present disclosure and may not constitute prior art.

As one of the methods of controlling a motion of an object without coming into direct contact with the object, there is a method of applying force to one region by using a plurality of transducers disposed to generate acoustic waves or ultrasonic waves and controlling a phase of wave energy emitted from each of the transducers.

Meanwhile, the wave energy, which reaches one region in which the object is present, decreases as a distance between the transducer and the object increases. However, we have discovered that because the plurality of transducers is disposed on a plane, a distance to the object to be controlled varies for each of the transducers. This means that the transducer, which is spaced apart from the object to be controlled at a large distance, causes a great loss of wave energy. As a result, an overall loss of energy is great in a force generating device having the plurality of transducers.

Furthermore, because the force generating device including the plurality of transducers in the related art focuses on an operation of simply lifting an object or an operation of concentrating force on a specific region, it is difficult to control a precise motion of the object such as a rotational motion.

SUMMARY

An object of the present disclosure is to provide a force generating device having better energy efficiency than that in the related art.

Another object of the present disclosure is to provide a force generating device capable of controlling a precise motion of an object.

In order to achieve the above-mentioned objects, one aspect of the present disclosure provides a force generating device including: a support unit; a link unit rotatably coupled to one side of the support unit; a transfer unit coupled to the link unit; and a drive unit configured to operate the link unit, in which the transfer unit includes a plurality of transfer parts configured to transfer wave energy to the outside, the link unit is configured to move the plurality of transfer parts, and the transfer unit is configured to transfer the wave energy toward a center F of an internal space defined by the plurality of transfer parts.

The link unit may be rotatably coupled to the other side of the support unit.

The link unit may include: a first link part having one end portion rotatably coupled to one side of the support unit; and a second link part having one end portion rotatably coupled to the other side of the support unit, and the plurality of transfer parts may include: a first transfer part provided to be adjacent to the other end portion of the first link part which is opposite to one end portion of the first link part; and a second transfer part provided to be adjacent to the other end portion of the second link part which is opposite to one end portion of the second link part.

The link unit may include: a third link part having one end portion rotatably coupled to the other end portion of the first link part; and a fourth link part having one end portion rotatably coupled to the other end portion of the second link part, and the other end portion of the third link part, which is opposite to one end portion of the third link part, and the other end portion of the fourth link part, which is opposite to one end portion of the fourth link part, may be rotatably provided to face each other.

The plurality of transfer parts may further include a third transfer part provided to be adjacent to the other end portion of the third link part and the other end portion of the fourth link part.

Each of the first link part and the second link part may have an arc shape curved to have a curvature corresponding to a curvature of an imaginary concentric sphere having a center identical to the center F.

Each of the third link part and the fourth link part may have an arc shape curved to have a curvature corresponding to the curvature of the imaginary concentric sphere having the center identical to the center F.

The drive unit may include a first drive part configured to rotate the first link part in a state in which one end portion of the first link part is fixed to one side of the support unit.

The drive unit may further include a second drive part configured to rotate the second link part in a state in which one end portion of the second link part is fixed to the other side of the support unit.

The transfer part may include: a body portion configured to define a body of the transfer part and having a curved surface; and a plurality of energy generators provided on an inner surface of the body portion and configured to generate the wave energy, and each of the plurality of energy generators may be configured to transfer the wave energy to the center F.

The body portion may have a shape curved to have a curvature corresponding to a curvature of an imaginary concentric sphere having a center identical to the center F.

The force generating device may further include: a first connection part configured to connect the first link part and the third link part and provided in a region in which the first link part and the third link part meet together; and a second connection part configured to connect the second link part and the fourth link part and provided in a region in which the second link part and the fourth link part meet together.

The force generating device may further include a third connection part configured to connect the third link part and the fourth link part and provided in a region in which the third link part and the fourth link part meet together.

The link unit may include: a first link part having one end portion rotatably coupled to one side of the support unit; and a second link part having one end portion rotatably coupled to the other side of the support unit, and the plurality of transfer parts may include: a first transfer part provided to be adjacent to one end portion of the first link part; and a second transfer part provided to be adjacent to one end portion of the second link part.

The link unit may further include: a third link part having one end portion rotatably coupled to the other end portion of the first link part which is opposite to one end portion of the first link part, and the other end portion rotatably coupled to the other end portion of the second link part which is opposite to one end portion of the second link part.

The plurality of transfer parts may further include: a third transfer part provided to be adjacent to the other end portion of the first link part which is opposite to one end portion of the first link part; and a fourth transfer part provided to be adjacent to the other end portion of the second link part which is opposite to one end portion of the second link part.

A central angle of the arc of each of the first link part and the second link part may correspond to a central angle of the arc of each of the third link part and the fourth link part.

The central angle of the arc of each of the first to fourth link parts may be a right angle.

The central angle of the arc of each of the first to fourth link parts may be an obtuse angle.

Each of the first to third link parts may have an arc shape curved to have a curvature corresponding to a curvature of an imaginary concentric sphere having a center identical to the center F, and a central angle of the arc of each of the first link part and the second link part may be larger than a central angle of the arc of the third link part.

A rotation axis of the first connection part and a rotation axis of the second connection part may pass through the center F.

A rotation axis of the third connection part may pass through the center F.

According to the present disclosure, it is possible to provide the force generating device having better energy efficiency than that in the related art.

In addition, according to the present disclosure, it is possible to provide the force generating device capable of controlling a precise motion of the object.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
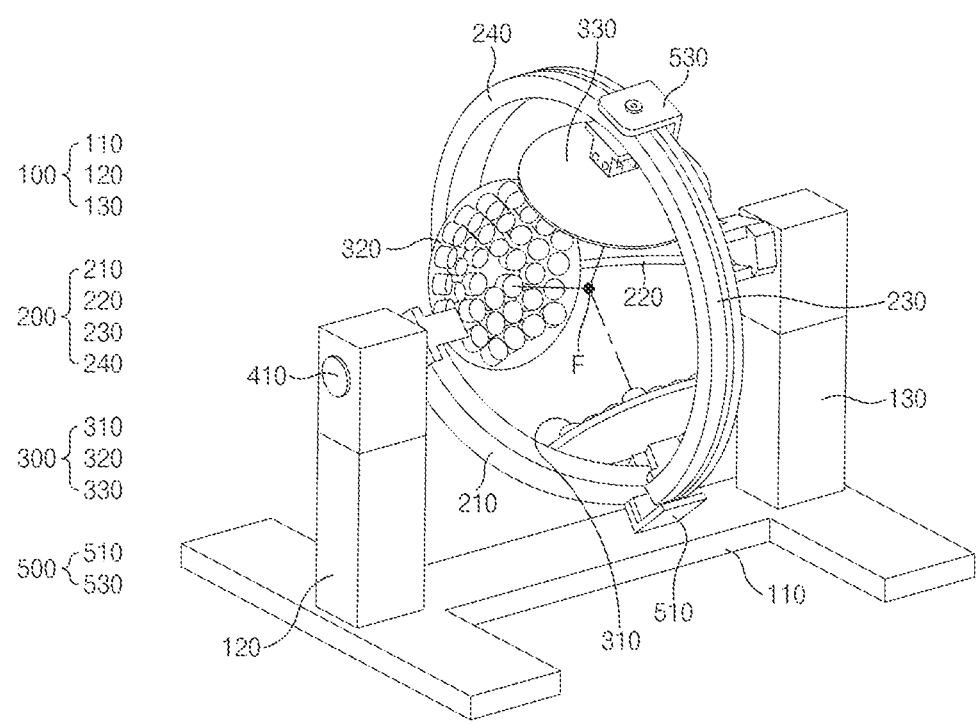
FIG. 1 is a perspective view illustrating a structure of a force generating device according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a structure and an operational principle of a force generating device according to the present disclosure will be described with reference to the drawings.

Figure 2:
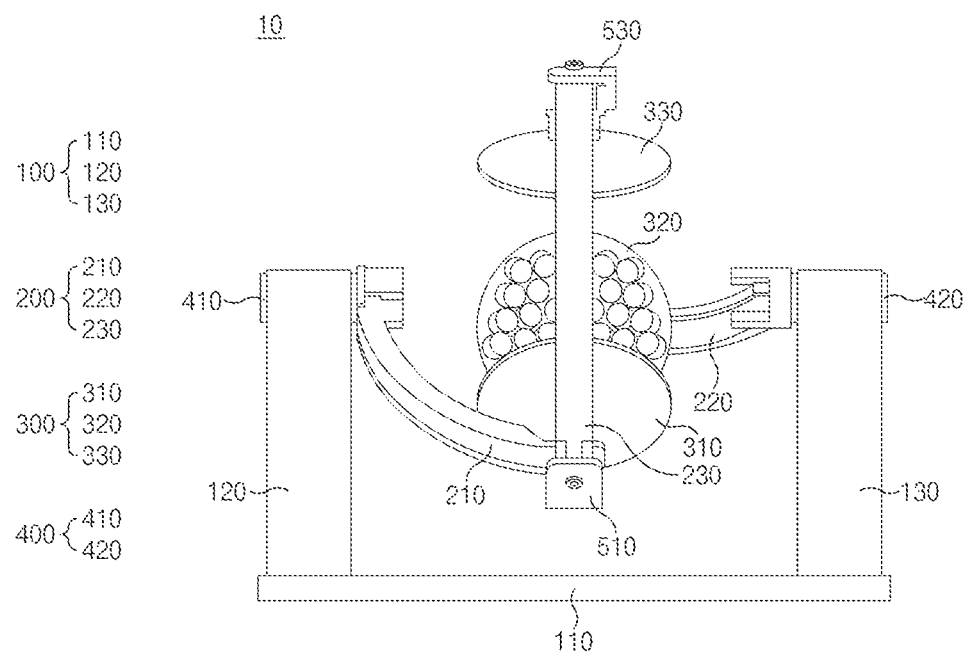
FIG. 2 is a side view illustrating a structure of the force generating device according to the first exemplary form of the present disclosure.
Figure 3:
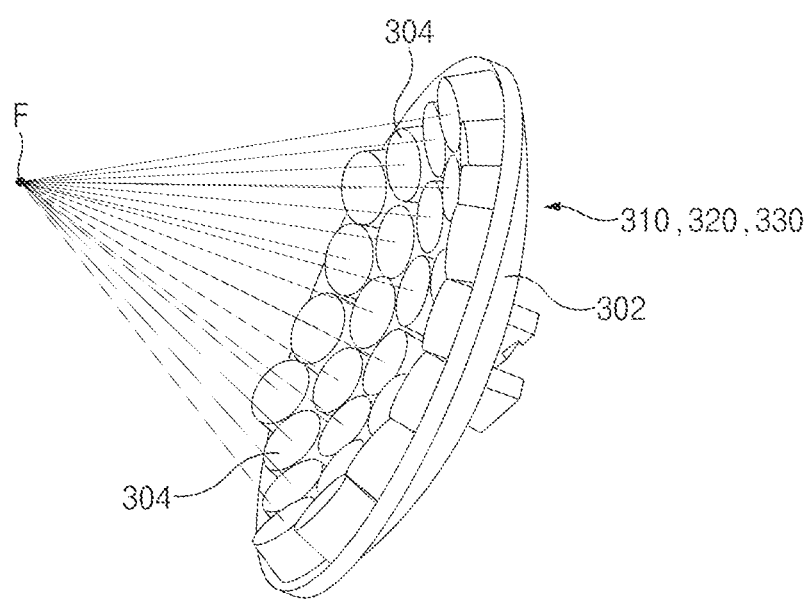
FIG. 3 is an enlarged perspective view illustrating a structure of a transfer part of the force generating device according to one form of the present disclosure.
Figure 4C:
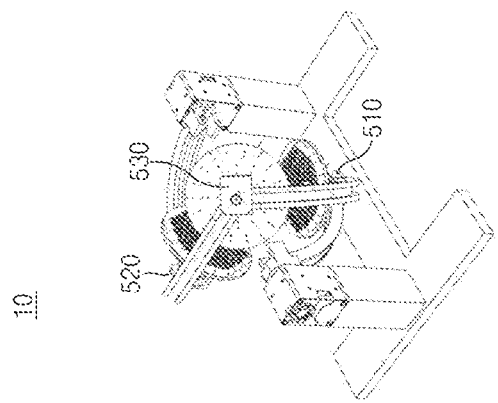
FIGS. 4A to 4C are perspective views illustrating various operational examples of the force generating device according to the first exemplary form of the present disclosure.
Figure 4B:
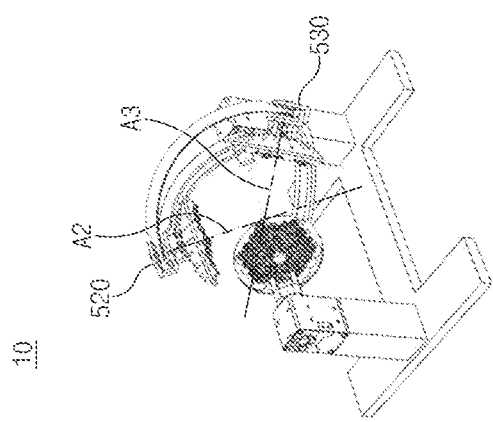
Figure 4A:
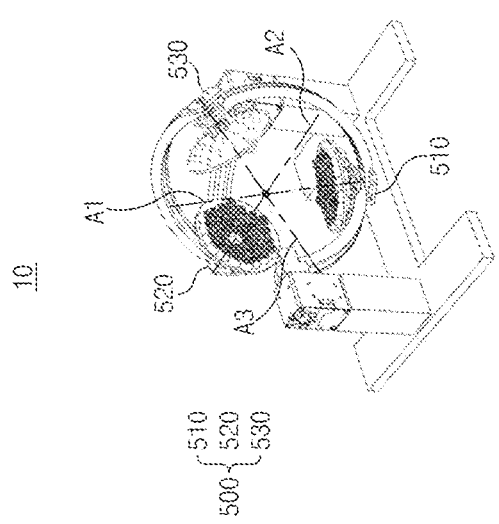

FIG. 1 is a perspective view illustrating a structure of a force generating device according to a first exemplary form of the present disclosure, and FIG. 2 is a side view illustrating a structure of the force generating device according to the first exemplary form of the present disclosure. In addition, FIG. 3 is an enlarged perspective view illustrating a structure of a transfer part of the force generating device according to one form of the present disclosure, and FIGS. 4A to 4C are perspective views illustrating various operational examples of the force generating device according to the first exemplary form of the present disclosure.

Referring to FIGS. 1 and 2, a force generating device 10 may include a support unit 100. The support unit 100 may be provided at a lower side of the force generating device 10 and configured to support other components of the force generating device 10.

In more detail, the support unit 100 may include a bottom part 110 configured to define a lower region of the support unit 100 and having a flat shape, a first support part 120 provided at one side of the bottom part 110 and having a shape protruding upward, and a second support part 130 provided at the other side of the bottom part 110 and having a shape protruding upward.

In addition, the force generating device 10 may include a link unit 200 coupled to the support unit 100 so as to be rotatable with respect to one side and the other side of the support unit 100. In more detail, the link unit 200 may be rotatably coupled to the first support part 120 and rotatably coupled to the second support part 130.

Continuing to refer to FIGS. 1 and 2, the force generating device 10 according to the present disclosure may further include a transfer unit 300 coupled to the link unit 200 and configured to transfer wave energy to the outside, and a drive unit 400 configured to operate the link unit 200. In one form, at least a part of the link unit 200 is rotated with respect to the first support part 120 and/or the second support part 130 by energy provided by the drive unit 400, and thus the transfer unit 300 coupled to the link unit 200 also moves. Therefore, in accordance with the motion of the link unit 200, the transfer unit 300 may be disposed at various positions and may transfer the wave energy to a specific region.

In another form, the motion of the transfer unit 300 may be restricted so that the transfer unit 300 is moved along a predetermined trajectory by the motion of the link unit 200.

In one form, the transfer unit 300 may be moved on an imaginary sphere by the motion of the link unit 200, and the transfer unit 300 may transfer the wave energy to a center F of the imaginary sphere. That is, the transfer unit 300, which is moved in a restricted manner on the imaginary sphere by the motion of the link unit 200, may transfer the wave energy to the center F of the sphere from any point on the imaginary sphere while moving on the imaginary sphere. Therefore, it is possible to freely control a motion of an object provided on the imaginary sphere. Hereinafter, detailed structures of the link unit 200 and the transfer unit 300 of the force generating device 10 according to the present disclosure will be described.

Referring to FIGS. 1 and 2, the link unit 200 may include a first link part 210 having one end portion rotatably coupled to one side of the support unit 100, and a second link part 220 having one end portion rotatably coupled to the other side of the support unit 100. In more detail, the first link part 210 may be rotatably coupled to an upper region of the first support part 120, and the second link part 220 may be rotatably coupled to an upper region of the second support part 130.

In addition, the transfer unit 300 may include a plurality of transfer parts configured to transfer the wave energy to the outside. In more detail, the plurality of transfer parts may include a first transfer part 310 provided to be adjacent to the other end portion of the first link part 210 which is opposite to one end portion of the first link part 210, and a second transfer part 320 provided to be adjacent to the other end portion of the second link part 220 which is opposite to one end portion of the second link part 220. For example, FIGS. 1 and 4 illustrate a state in which the first transfer part 310 is coupled to the other end portion of the first link part 210, and the second transfer part 320 is coupled to the other end portion of the second link part 220. In one form, the link unit 200 may move the plurality of transfer parts on the predetermined trajectory.

In another form, the transfer unit 300 may transfer the wave energy toward the center F of the internal space formed by the plurality of transfer parts. In this case, the internal space formed by the plurality of transfer parts may have a shape of the imaginary sphere, and the center of the internal space may be the center of the imaginary sphere.

Continuing to refer to FIGS. 1 and 2, according to the first exemplary form of the present disclosure, the link unit 200 may further include a third link part 230 having one end portion rotatably coupled to the other end portion of the first link part 210, and a fourth link part 240 having one end portion rotatably coupled to the other end portion of the second link part 220. In this case, as illustrated in FIGS. 1 and 2, the other end portion of the third link part 230, which is opposite to one end portion of the third link part 230, and the other end portion of the fourth link part 240, which is opposite to one end portion of the fourth link part 240, are rotatably provided to face each other.

In addition, the plurality of transfer parts provided in the transfer unit 300 may further include a third transfer part 330 provided to be adjacent to the other end portion of the third link part 230 and the other end portion of the fourth link part 240. FIGS. 1 and 4 illustrate a state in which the third transfer part 330 is coupled to the other end portion of the third link part 230, and the other end portion of the fourth link part 240 is provided to face the third transfer part 330 with the third link part 230 interposed therebetween.

As illustrated in FIGS. 1 and 2, according to some forms of the present disclosure, each of the link parts, which constitute the link unit 200, may have an arc shape curved to have a predetermined curvature. In more detail, each of the first to fourth link parts 210, 220, 230, and 240 may have an arc shape curved to have a curvature corresponding to a curvature of an imaginary concentric sphere having a center identical to the center F of the imaginary sphere. For example, the imaginary concentric sphere may have the same size as the imaginary sphere. The configuration in which each of the first to fourth link parts 210, 220, 230, and 240 has the curved arc shape may be implemented so that the transfer unit 300 has a motion trajectory on the imaginary sphere which is restricted by the link unit 200. More particularly, the first to fourth link parts 210, 220, 230, and 240 may have arc shapes having curvatures having the same magnitudes.

In one form, the drive unit 400 may include a first drive part 410 configured to rotate the first link part 210 on the imaginary sphere in a state in which one end portion of the first link part 210 is fixed to one side of the support unit 100 (i.e., the first support part 120), and a second drive part 420 configured to rotate the second link part 220 on the imaginary sphere in a state in which one end portion of the second link part 220 is fixed to the other side of the support unit 100 (i.e., the second support part 130). In this case, the first drive part 410 and the second drive part 420 may be inserted into the first support part 120 and the second support part 130, respectively. For example, each of the first drive part 410 and the second drive part 420 may be a motor having a rotary shaft. In this case, the rotary shaft provided in the first drive part 410 and the rotary shaft provided in the second drive part 420 may be coupled to one end portion of the first link part 210 and one end portion of the second link part 220, respectively.

Referring to FIG. 3, each of the transfer parts 310, 320, and 330, which constitute the transfer unit 300, may include a body portion 302 configured to define a body of each of the transfer parts and having an inner surface curved toward the center F, and a plurality of energy generators 304 provided on the inner surface of the body portion 302 and configured to generate the wave energy. In this case, each of the plurality of energy generators 304 may be configured to transfer the wave energy to the center F of the imaginary sphere. Therefore, the force generating device 10 may consistently transfer the wave energy to a specific region, that is, a region in which the center F is positioned wherever the transfer parts 310, 320, and 330, which constitute the transfer unit 300, are present by the motion of the link unit 200. In one form, the inner surface of the body portion 302 may have a curved shape so as to have a curvature corresponding to the curvature of the imaginary concentric sphere having the center identical to the center F of the imaginary sphere.

Meanwhile, the force generating device 10 according to one form of the present disclosure may further include a connection unit 500 configured to connect the link parts and disposed in the region in which the link parts, which constitute the link unit 200, face one another.

In more detail, referring to FIGS. 1, 2, and 4, the connection unit 500 may include a first connection part 510 configured to connect the first link part 210 and the third link part 230 and provided in a region in which the first link part 210 and the third link part 230 meet together, a second connection part 520 configured to connect the second link part 220 and the fourth link part 240 and provided in a region in which the second link part 220 and the fourth link part 240 meet together, and a third connection part 530 configured to connect the third link part 230 and the fourth link part 240 and provided in a region in which the third link part 230 and the fourth link part 240 meet together.

In this case, the first connection part 510 may be provided to surround an outer portion of the first link part 210 and an outer portion of the third link part 230. More particularly, the first connection part 510 may include two members each having an L-shaped cross section, and the two members may be provided to surround the outer portion of the first link part 210 and the outer portion of the third link part 230, respectively. In addition, the second connection part 520 may be provided to surround an outer portion of the second link part 220 and an outer portion of the fourth link part 240. More particularly, the second connection part 520 may include two members each having an L-shaped cross section, and the two members may be provided to surround the outer portion of the second link part 220 and the outer portion of the fourth link part 240, respectively. Lastly, the third connection part 530 may be provided to surround the outer portion of the third link part 230 and the outer portion of the fourth link part 240. More particularly, the third connection part 530 may include two members each having an L-shaped cross section, and the two members may be provided to surround the outer portion of the third link part 230 and the outer portion of the fourth link part 240, respectively. In addition, the force generating device 10 according to the present disclosure may further include penetration members configured to penetrate the link parts and the connection parts to connect the link parts and the connection parts.

As illustrated in FIGS. 4A to 4C, according to the first exemplary form of the present disclosure, when the first link part 210 and/or the second link part 220 rotates, the motions of the first to fourth link parts 210, 220, 230, and 240 are restricted by the coupling structures between the first to fourth link parts 210, 220, 230, and 240. Therefore, the motions of the first to third transfer parts 310, 320, and 330, which constitute the transfer unit 300, are also restricted. In particular, since each of the first to fourth link parts 210, 220, 230, and 240 has the arc shape having the curvature corresponding to the curvature of the imaginary concentric sphere having the center identical to the center F, each of the first to third transfer parts 310, 320, and 330 may also move only on the imaginary sphere having the center identical to the center F. Therefore, it is possible to freely control a motion of an object provided at the center F (see FIG. 1). For example, according to the present disclosure, the components of the force generating device 10 may be disposed as illustrated in FIG. 4A and then disposed as illustrated in FIG. 4B or 4C, such that it is possible to implement a rotational motion of the object, which is provided at the center, while floating the object in the air.

More particularly, referring to FIGS. 1, 2, and 4, a rotation axis A1 of the first connection part 510, a rotation axis A2 of the second connection part 520, and a rotation axis A3 of the third connection part 530 may pass through the center F of the imaginary sphere, that is, the center F of the internal space defined by the plurality of transfer parts. In this case, the rotation axis A1 of the first connection part 510 may mean a central axis about which the first link part 210 and the third link part 230 rotate relative to each other, the rotation axis A2 of the second connection part 520 may mean a central axis about which the second link part 220 and the fourth link part 240 rotate relative to each other, and the rotation axis A3 of the third connection part 530 may mean a central axis about which the third link part 230 and the fourth link part 240 rotate relative to each other. According to some forms of the present disclosure, since the rotation axes of the connection parts pass through the center F as described above, the plurality of link parts of the link unit 200 and the transfer parts 310, 320, 330, and 340 are moved on the imaginary sphere, such that it is possible to transfer the wave energy always toward the center F regardless of the positions of the transfer parts 310, 320, 330, and 340.

As described above, each of the first to fourth link parts 210, 220, 230, and 240 may have an arc shape. In this case, a central angle of the arc of each of the first link part 210 and the second link part 220 may correspond to a central angle of the arc of each of the third link part 230 and the fourth link part 240. For example, the central angle of the arc of each of the first link part 210 and the second link part 220 may be equal to the central angle of the arc of each of the third link part 230 and the fourth link part 240. In addition, for example, the central angle of the arc of each of the first to fourth link parts 210, 220, 230, and 240 may be a right angle.

Figure 5:
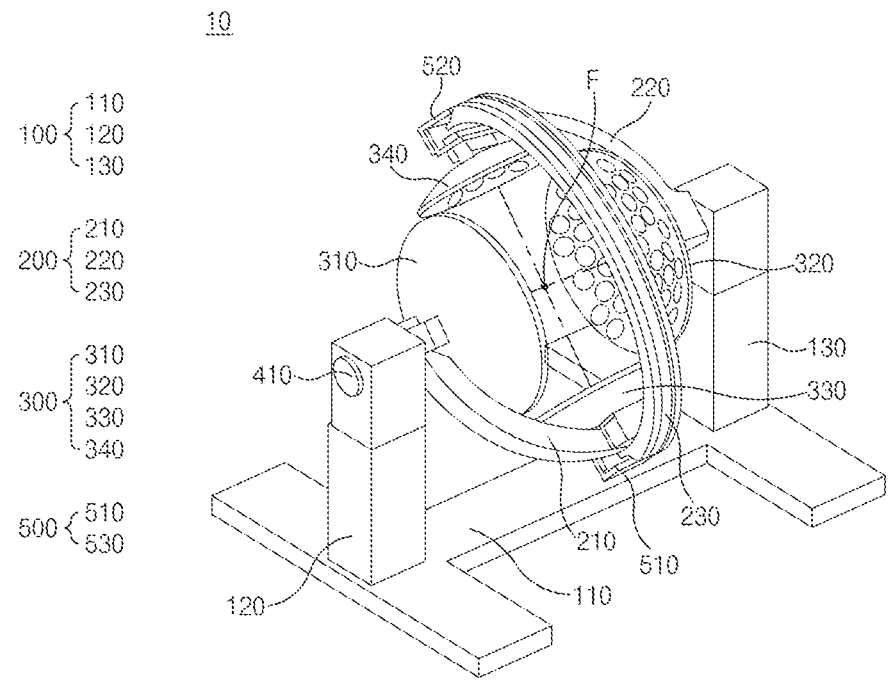
FIG. 5 is a perspective view illustrating a structure of a force generating device according to a second exemplary form of the present disclosure.

FIG. 5 is a perspective view illustrating a structure of a force generating device according to a second exemplary form of the present disclosure. The details of the support unit 100 may be replaced with the contents described above in the first exemplary form of the present disclosure.

Referring to FIG. 5, a link unit 200 of a force generating device 10 may include a first link part 210 having one end portion rotatably coupled to one side of a support unit 100 (i.e., a first support part 120), and a second link part 220 having one end portion rotatably coupled to the other side of the support unit 100 (i.e., a second support part 130).

In one form, a transfer unit 300 may include a first transfer part 310 provided to be adjacent to one end portion of the first link part 210, and a second transfer part 320 provided to be adjacent to one end portion of the second link part 220. Therefore, according to the second exemplary form of the present disclosure, the first transfer part 310 may be provided to face the first support part 120 with the first link part 210 interposed therebetween, and the second transfer part 320 may be provided to face the second support part 130 with the second link part 220 interposed therebetween, unlike the first exemplary form of the present disclosure.

Continuing to refer to FIG. 5, according to the second exemplary form of the present disclosure, the link unit 200 may further include a third link part 230 having one end portion rotatably coupled to the other end portion of the first link part 210 which is opposite to one end portion of the first link part 210, and the other end portion rotatably coupled to the other end portion of the second link part 220 which is opposite to one end portion of the second link part 220. That is, according to the second exemplary form of the present disclosure, the link unit 200 may have the total of three link parts 210, 220, and 230, unlike the first exemplary form of the present disclosure.

In addition, according to the second exemplary form of the present disclosure, the plurality of transfer parts of the transfer unit 300 may further include a third transfer part 330 provided to be adjacent to the other end portion of the first link part 210 which is opposite to one end portion of the first link part 210, and a fourth transfer part 340 provided to be adjacent to the other end portion of the second link part 220 which is opposite to one end portion of the second link part 220. That is, according to the second exemplary form of the present disclosure, the plurality of transfer parts of the transfer unit 300 may include the total of four transfer parts 310, 320, 330, and 340, unlike the first exemplary form of the present disclosure.

Meanwhile, even in the case of the second exemplary form of the present disclosure, each of the first to third link parts 210, 220, and 230 may have an arc shape curved to have a curvature corresponding to a curvature of an imaginary concentric sphere having a center identical to the center F of the imaginary sphere. However, according to the second exemplary form of the present disclosure, a central angle of the arc of each of the first link part 210 and the second link part 220 may be smaller than a central angle of the arc of the third link part 230, unlike the first exemplary form of the present disclosure. For example, the central angle of the arc of the third link part 230 may be twice the central angle of the arc of each of the first link part 210 and the second link part 220. In addition, for example, the central angle of the arc of each of the first link part 210 and the second link part 220 may be a right angle, and the central angle of the arc of the third link part 230 may be 180 degrees.

Figure 6:
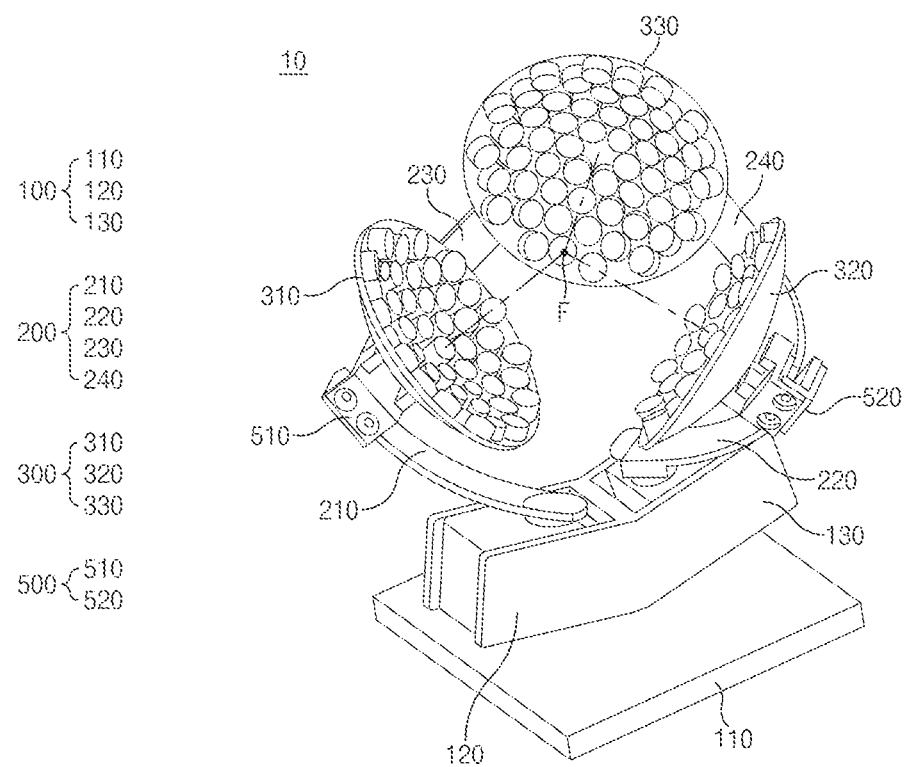
FIG. 6 is a perspective view illustrating a structure of a force generating device according to a modified example of the first exemplary form of the present disclosure.

FIG. 6 is a perspective view illustrating a structure of a force generating device according to a modified example of the first exemplary form of the present disclosure.

As illustrated in FIG. 6, a configuration of a force generating device 10 according to a modified example of the first exemplary form of the present disclosure may be mostly similar to the configuration of the force generating device according to the first exemplary form of the present disclosure. However, according to the modified example of the first exemplary form of the present disclosure, the central angle of the arc of each of the first to fourth link parts 210, 220, 230, and 240 may be an obtuse angle. For example, the central angle of the arc of each of the first to fourth link parts 210, 220, 230, and 240 may be 120 degrees.

Meanwhile, the transfer unit 300 or the energy generators 304 provided in the force generating device according to the present disclosure may transfer ultrasonic wave energy.

The present disclosure has been described with reference to the limited exemplary forms and the drawings, but the present disclosure is not limited thereto. The described exemplary forms may be carried out in various forms by those skilled in the art to which the present disclosure pertains within the technical spirit of the present disclosure.

What is claimed is:

1. A force generating device comprising:
a plurality of support parts;
a link rotatably coupled to a first support part among the plurality of support parts and rotatably coupled to a second support part among the plurality of support parts, wherein the link comprises:
   a first link part having a first end portion rotatably coupled to the first support part,
   a second link part having a first end portion rotatably coupled to the second support part,
   a third link part having a first end portion rotatably coupled to a second end portion of the first link part, and
   a fourth link part having a first end portion rotatably coupled to the second end portion of the second link part,
   wherein the second end portion of the third link part and the second end portion of the fourth link part are configured to be rotatable relative to each other;
a plurality of transfer parts coupled to the link, where the plurality of transfer parts are configured to transfer wave energy to an outside; and
a plurality of drive parts configured to operate the link, wherein
   the plurality of transfer parts comprises:
      a first transfer part provided to be adjacent to a second end portion of the first link part which is opposite to the first end portion of the first link part,
      a second transfer part provided to be adjacent to a second end portion of the second link part which is opposite to the first end portion of the second link part, and
      a third transfer part provided to be adjacent to a second end portion of the third link part and a second end portion of the fourth link part,
   each of the first link part and the second link part has an arc shape having a curvature corresponding to a curvature of an imaginary concentric sphere having a center identical to a center of an internal space defined by the plurality of transfer parts,
   the link is configured to move the plurality of transfer parts, and
   the plurality of transfer parts is further configured to transfer the wave energy toward a center of an internal space defined by the plurality of transfer parts.

2. The force generating device of claim 1, wherein each of the third link part and the fourth link part has an arc shape having a curvature corresponding to the curvature of the imaginary concentric sphere having the center identical to the center of the internal space.

3. The force generating device of claim 2, wherein a central angle of each arc shape of the first link part and the second link part corresponds to a central angle of each arc shape of the third link part and the fourth link part.

4. The force generating device of claim 3, wherein the central angle of the arc shape of each of the first to fourth link parts is a right angle.

5. The force generating device of claim 3, wherein the central angle of the arc shape of each of the first to fourth link parts is an obtuse angle.

6. The force generating device of claim 1, wherein the plurality of drive parts comprises:
a first drive part configured to rotate the first link part in a state in which the first end portion of the first link part is fixed to the first support part; and
a second drive part configured to rotate the second link part in a state in which the first end portion of the second link part is fixed to the second support part.

7. The force generating device of claim 1, wherein a transfer part among the plurality of transfer parts comprises:
a body portion configured to have a curved surface; and
a plurality of energy generators provided on an inner surface of the body portion and configured to generate the wave energy, and
wherein each energy generator of the plurality of energy generators is configured to transfer the wave energy to the center of the internal space.

8. The force generating device of claim 7, wherein the body portion has a curvature corresponding to a curvature of an imaginary concentric sphere having a center identical to the center of the internal space.

9. A force generating device comprising:
a plurality of support parts;
a link rotatably coupled to a first support part among the plurality of support parts and rotatably coupled to a second support part among the plurality of support parts, wherein the link comprises:
   a first link part having a first end portion rotatably coupled to the first support part,
   a second link part having a first end portion rotatably coupled to the second support part,
   a third link part having a first end portion rotatably coupled to a second end portion of the first link part, and
   a fourth link part having a first end portion rotatably coupled to the second end portion of the second link part,
   wherein the second end portion of the third link part and the second end portion of the fourth link part are configured to be rotatable relative to each other;
a plurality of transfer parts coupled to the link, wherein the plurality of transfer parts is configured to transfer wave energy to an outside, and wherein the plurality of transfer parts comprises:

a first transfer part provided to be adjacent to a second end portion of the first link part which is opposite to the first end portion of the first link part, and a second transfer part provided to be adjacent to a second end portion of the second link part which is opposite to the first end portion of the second link part, and a third transfer part provided to be adjacent to a second end portion of the third link part and a second end portion of the fourth link part; and a plurality of drive parts configured to operate the link; and wherein:
the link is configured to move the plurality of transfer parts, and the plurality of transfer parts is further configured to transfer the wave energy toward a center of an internal space defined by the plurality of transfer parts, and the force generating device further comprises:
a first connection part configured to connect the first link part and the third link part and provided in a region in which the first link part and the third link part meet together; and a second connection part configured to connect the second link part and the fourth link part and provided in a region in which the second link part and the fourth link part meet together.

10. The force generating device of claim 9, wherein a rotation axis of the first connection part and a rotation axis of the second connection part are configured to pass through the center of the internal space.

11. The force generating device of claim 9, further comprising:
a third connection part configured to connect the third link part and the fourth link part and provided in a region in which the third link part and the fourth link part meet together.

12. The force generating device of claim 11, wherein a rotation axis of the third connection part is configured to pass through the center of the internal space.

13. A force generating device comprising:
a plurality of support parts;
a link rotatably coupled to a first support part among the plurality of support parts and rotatably coupled to a second support part among the plurality of support parts, wherein the link comprises:
a first link part having a first end portion rotatably coupled to the first support part,
a second link part having a first end portion rotatably coupled to the second support part, and
a third link part having a first end portion rotatably coupled to a second end portion of the first link part which is opposite to the first end portion of the first link part, and a second end portion rotatably coupled to the second end portion of the second link part which is opposite to the first end portion of the second link part;
a plurality of transfer parts coupled to the link, wherein the plurality of transfer parts is configured to transfer wave energy to an outside, and wherein the plurality of transfer parts comprises:

a first transfer part provided to be adjacent to the first end portion of the first link part, a second transfer part provided to be adjacent to the first end portion of the second link part, a third transfer part provided to be adjacent to the second end portion of the first link part, and a fourth transfer part provided to be adjacent to the second end portion of the second link part; and a plurality of drive parts configured to operate the link, and wherein:
the link is configured to move the plurality of transfer parts, and the plurality of transfer parts is further configured to transfer the wave energy toward a center of an internal space defined by the plurality of transfer parts.

14. A force generating device comprising:
a plurality of support parts;
a link rotatably coupled to a first support part among the plurality of support parts and rotatably coupled to a second support part among the plurality of support parts, wherein the link comprises:
a first link part having a first end portion rotatably coupled to the first support part,
a second link part having a first end portion rotatably coupled to the second support part, and
a third link part having a first end portion rotatably coupled to a second end portion of the first link part which is opposite to the first end portion of the first link part, and a second end portion rotatably coupled to the second end portion of the second link part which is opposite to the first end portion of the second link part;
a plurality of transfer parts coupled to the link; and
a plurality of drive parts configured to operate the link, wherein:
the plurality of transfer parts is configured to transfer wave energy to an outside, wherein the plurality of transfer parts comprises:
a first transfer part provided to be adjacent to the first end portion of the first link part, and
a second transfer part provided to be adjacent to the first end portion of the second link part, the link is configured to move the plurality of transfer parts, the plurality of transfer parts is further configured to transfer the wave energy toward a center of an internal space defined by the plurality of transfer parts, each of the first link part, the second link part, and the third link part has an arc shape having a curvature corresponding to a curvature of an imaginary concentric sphere having a center identical to the center of the internal space, and a central angle of the arc shape of each of the first link part and the second link part is larger than a central angle of the arc shape of the third link part.

* * * * *